United States Patent [19]
Tsubakimoto et al.

[11] 4,069,176
[45] Jan. 17, 1978

[54] PROCESS FOR PRODUCING DYED FINELY DIVIDED HARDENED BENZOGUANAMINE RESINS HAVING UNIFORM PARTICLE SIZE AND EXCELLING IN DISPERSIBILITY

[75] Inventors: Tsuneo Tsubakimoto; Iwao Fuzikawa, both of Toyonaka; Katsumi Uchida, Shimamoto; Osamu Minamidani, Higashiosaka, all of Japan

[73] Assignee: Nippon Shokubai Kagaku Kogyo Co. Ltd., Osaka, Japan

[21] Appl. No.: 704,744

[22] Filed: July 12, 1976

[30] Foreign Application Priority Data

July 30, 1975 Japan .................................. 50-91935

[51] Int. Cl.$^2$ .............................................. C08K 3/36
[52] U.S. Cl. ................................ 260/39 P; 260/39 SB; 260/851
[58] Field of Search ............... 260/39 R, 39 SB, 39 P, 260/851

[56] References Cited
U.S. PATENT DOCUMENTS

| 2,825,708 | 3/1958 | Auer | 260/39 R X |
| 3,714,085 | 1/1973 | Berstein et al. | 260/39 R X |
| 3,879,335 | 4/1975 | Storck et al. | 260/39 R X |
| 3,945,980 | 3/1976 | Tsubakimota et al. | 260/39 P |

Primary Examiner—Sandra M. Person
Attorney, Agent, or Firm—Sherman & Shalloway

[57] ABSTRACT

A process for producing a dyed finely divided hardened resin of uniform particle size excelling in dispersibility which comprises, in combination, the steps of reacting benzoguanamine with formaldehyde in a ratio of 1.0 mole of the former to 1.2 – 3.5 moles of the latter in an aqueous medium at a pH ranging between 5 and 10 to prepare an aqueous liquid of a soluble and fusible resin having a degree of modified water tolerance of 0–150%, preparing an aqueous emulsion of a dyed soluble and fusible resin by using said aqueous liquid, a dye and a protective colloid, adding to the thus prepared aqueous emulsion in a ratio of 1 – 15 parts by weight per 100 parts by weight of the soluble and fusible resin of ultramicroscopic silica of a specific surface area as measured by the Brunauer, Emmett and Teller Method in the range of about 50 m$^2$/g to about 400 m$^2$/g and a particle size in the range of about 0.005 to about 0.05 micron, adding a curing catalyst, holding the aqueous emulsion for at least one hour at a temperature in the range of 40°–60° C., heating the aqueous emulsion at a temperature in the range of 60°–200° C. at normal atmospheric or superatmospheric pressure to harden the resin thereby preparing a suspension of a dyed finely divided hardened resin, and thereafter separating the hardened resin from the suspension followed by drying and deaggregating the dried hardened resin.

11 Claims, No Drawings

PROCESS FOR PRODUCING DYED FINELY DIVIDED HARDENED BENZOGUANAMINE RESINS HAVING UNIFORM PARTICLE SIZE AND EXCELLING IN DISPERSIBILITY

This invention relates to a process for producing dyed finely divided hardened benzoguanamine resins having uniform particle size and excelling in dispersibility.

Processes for producing finely divided hardened resins by adding a curing catalyst such as sulfuric acid to an aqueous solution of an amino resin obtained by reacting either melamine or urea with formaldehyde and then polymerizing the resin with stirring have been known in the past. However, these known processes possess a number of shortcomings, since the amino resins would rapidly harden in the presence of the curing catalyst to become insoluble and infusible. For instance, in these processes it is necessary to conduct the hardening operation under strictly controlled conditions for obtaining a finely divided hardened resin having an uniform particle size. And even though the operation is carried out under such conditions, it still is difficult to make the particle size uniform. Further, when it is intended to produce dyed finely divided hardened resins, there are imposed such restrictions as to the class of dye that can be used and the time of its use in the case of the conventional processes, it being possible to obtain dyed finely divided hardened resins only by a procedure consisting of adding a water-soluble dyestuff when the amino resin is in an aqueous solution state and then hardening the resin. Moreover, when the dye is one which exhibits acidity, the hardening of the resin is accelerated by the addition of such a dye to form an insoluble and infusible hardened resin, with the consequence that the dyeing becomes unsatisfactory.

In consequence of having engaged in extensive research with a view to overcoming the shortcomings of the conventional processes, we have made known that it is possible to produce a finely divided hardened resin which can be used effectively as a pigment by a procedure consisting of adding a curing catalyst to a dyed benzoguanamine type resin emulsion and causing the curing reaction to proceed while maintaining a state of emulsification to cause the resin to become insoluble and infusible or a procedure consisting of adding a water-soluble dye to an undyed benzoguanamine type resin emulsion and causing the curing reaction to proceed while maintaining a state of emulsification in the copresence of the curing catalyst to cause the resin to become insoluble and infusible thereby preparing an emulsion of a finely divided hardened resin, from which the resinous solid portion is separated and dried. (U.S. Pat. No. 3,945,980). The finely divided hardened resin obtained by the foregoing process is of particulate form whose sizes range from 0.5 to 10 microns, and since this resin is a pigment excellent in such properties as heat resistance, resistance to solvents and colorfastness, it can be used effectively in various fields such as for printing ink, coloring of plastics, coating materials and printing of textiles.

When we made a further detailed investigation of this finely divided hardened resin, it was found that this finely divided hardened resin not only consisted of discrete spheroidal particles but also coarse particle groups that had been formed by the aggregation of several to several tens of the single spheroidal particles. That is to say, the finely divided hardened resin obtained by hardening in the emulsified state followed by separation from the aqueous medium by filtration or centrifuging and settling and thereafter dried is in a massy state. While this can be readily rendered into a finely divided state by a slight pressure such as by lightly pressing between the fingers, the resulting powder contains, as described hereinabove, coarse particle groups that have been formed by the aggregation of several to several tens of the single spheroidal particles. Now, when such a finely divided hardened resin is used as a pigment dispersed in various media, these coarse particle groups each behave as if they are a single coarse particle to adversely affect the dispersibility of said finely divided hardened resin. The size of these coarse particle groups, though larger than the size of the single particles, is, of course, of the order of 10 – 20 microns. Hence, in many cases it is possible to use the finely divided hardened resin containing these coarse particle groups with no trouble at all. However, in those fields where an especially high degree of dispersibility is required, there are a number of cases where the presence of these coarse particle groups become a problem. When attempts are made to disintegrate these coarse particle groups, much time and a harsh comminution operation are required, since the bond between the single particles of these coarse particle groups is quite tough.

It is therefore an object of this invention to provide a process that can produce without the requirement for a prolonged period of a harsh comminution operation dyed finely divided hardened benzoguanamine resins having uniform particle size and not containing any coarse particle groups and of excellent dispersibility. Other objects will become apparent from the following description.

The dyed finely divided hardened benzoguanamine resins can be obtained in accordance with the present invention by operating in the following manner. Benzoguanamine and 1.2 – 3.5 moles, and preferably 1.8 – 3.0 moles, per mole thereof of formaldehyde are reacted at a pH in the range of 5 – 10 and suitably a temperature in the range of 50° – 100° C. using water as the reaction medium to prepare an aqueous liquid of a soluble and fusible resin whose degree of modified water tolerance is in the range of 0 – 150%. Using this aqueous liquid with a dye and a protective colloid, an aqueous emulsion of a dyed soluble and fusible resin is prepared, to which is then added in a proportion of 1 – 15 parts by weight per 100 parts by weight of the soluble and fusible resin of ultramicroscopic silica of particle size ranging between about 0.005 micron and about 0.05 micron and whose specific surface area as measured by the Brunauer, Emmett and Teller Method (hereinafter to be referred to as the BET Method) ranges from about 50 $m^2/g$ to about 400 $m^2/g$. This is followed by adding a curing catalyst and holding the temperature of the emulsion at 40° – 60° C. for at least 1 hour, after which the emulsion is heated at 60° – 200° C. at normal atmospheric or superatmospheric pressure to harden the resin and prepare a suspension of a dyed finely divided hardened resin. The hardened resin is separated from this suspension, dried and de-aggregated to obtain the intended dyed finely divided hardened benzoguanamine resin.

It has been confirmed on examining the finely divided hardened resin obtained by the process of this invention that there was substantially no presence of any coarse particle groups that have been formed by the aggregation of several to several tens of the single particles. Hence, in the case of the finely divided hardened resin of this invention, the harsh comminution operation such as hereinbefore described for disintegrating the coarse particle groups that have been formed by a tough bond is not necessary at all. Further, when studies were conducted and the performance as a pigment of the invention finely divided hardened resin was evaluated in the various fields of its application, it was found to exhibit not only heat resistance, solvent resistance and colorfastness comparable to those of the conventional products but also a marked improvement in dispersibility and staining power.

While it is difficult to give an exact explanation of the actions by which the excellent effects of the present invention are brought about, it is believed, in all likelihood, to be based on the following reasons. That is to say, the ultramicroscopic silica, which has been added to the aqueous emulsion of the unhardened soluble and fusible resin that has been dyed with a dye, adsorbs the free polyvinyl alcohol (protective colloid) that is in solution in the water medium of the emulsion inhibiting the bonding to take place between the finely divided hardened resin particles. Again, the ultramicroscopic silica adheres to the surface of the finely divided resin particles and thus demonstrates the action of preventing the secondary aggregation of the particles that results from the direct contact of the particles. Further, there is believed to be a synergism of these two actions.

The expression "degree of modified water tolerance" ($x$), as used herein, is a measure which indicates the affinity for water of the foregoing soluble and fusible resin and can be determined in the following manner. In a test which comprises adding dropwise water to a solution in 5 grams of methanol of 2 grams of an aqueous reaction product of formaldehyde and benzoguanamine, while holding the temperature of the solution at 25° C., the amount of water (W grams) required for causing the solution to become turbid is measured, and the degree of modified water tolerance ($x$) is then calculated as follows:

Degree of modified water tolerance $x = W/2 \times 100$ (%)

The foregoing aqueous liquid of a soluble and fusible resin of this invention is that in which the reaction product obtained by reacting benzoguanamine and formaldehyde in a water medium remains present in a state close to that of a water-in-oil type emulsion until the reaction product is rendered hydrophobic. A soluble and fusible resin of this kind is soluble in such organic solvents as acetone, dioxane and methanol but is substantially insoluble in water. Further, this soluble and fusible resin possesses a strong affinity for dyestuffs and can be readily dyed, using any of the dyes regardless of whether the dye is one which is water-soluble or oil-soluble. For instance, this resin can be dyed with various dyestuffs, including such as the water-soluble monoazo dyes, water-soluble polyazo dyes, metal-containing azo dyes, disperse azo dyes, anthraquinone acid dyes, anthraquinone vat dyes, alizarine dyes, disperse anthraquinone dyes, indigo dyes, sulfide dyes, phthalocyanine dyes, diphenylmethane dyes, triphenylmethane dyes, nitro dyes, nitroso dyes, thiazole dyes, xanthene dyes, acridine dyes, azine dyes, oxazine dyes, thiazine dyes, benzoquinone dyes, naphthoquinone dyes, and cyanine dyes.

In preparing the aforementioned soluble and fusible resin, the formaldehyde to be used may be any that produces formaldehyde, such as formalin, trioxane and paraformaldehyde, of which formalin is especially used with effectiveness.

The use of a pH of less than 5 or in excess of 10 is not to be desired in the process of this invention, since the reaction speed becomes too fast to cause difficulty in controlling the reaction. Further, as regards the degree of modified water tolerance, this also must be within the range specified. A degree of modified water tolerance in excess of 150% is not suitable, because the affinity for water is too great, with the consequence that when the resin is to be emulsified by introduction into the aqueous solution of protective colloid with stirring, the resin is plasticized and softened by means of water to cause aggregation and coalescence to take place between the individual emulsified particles. On the other hand, a degree of modified water tolerance of less than 0, i.e., a resin that does not dissolve at all in methanol, is also unsuitable, since in this case the viscosity of the resinous liquid itself is too high to cause difficulty in carrying out the emulsification operation.

In preparing the aqueous liquid of a soluble and fusible resin in this invention, melamine can be substituted for the benzoguanamine in an amount up to 30 mol%. That is to say, the intended aqueous liquid can be prepared by reacting 1.2 – 3.5 moles, and preferably 1.8 – 3.0 moles, of formaldehyde with 1.0 mole of a mixture of at least 70 mol% of benzoguanamine and not more than 30 mol% of melamine at a pH ranging from 5 to 10 at suitably a temperature of 50° – 100° C. It is not desirable to substitute the melamine in an amount in excess of 30 mol% of the benzoguanamine, for in such a case there is a marked decline in the affinity of the resulting resin for dyes, and especially the oil-soluble dyes. Again, the condensation reaction proceeds too rapidly to make it impossible to obtain a soluble and fusible resin.

The aqueous emulsion of a dyed soluble and fusible resin of this invention is a stable oil-in-water type emulsion wherein is uniformly dispersed a soluble and fusible resin of uniform particle size that has been dyed with a dye. This oil-in-water type emulsion can be easily prepared by first preparing an aqueous liquid of a soluble and fusible resin and then mixing a dye and a protective colloid therewith. For instance, it can be prepared by adding a dye to an aqueous liquid of a soluble and fusible resin with stirring to dye said resin and then introducing the aqueous liquid to an aqueous solution of a protective colloid with stirring. If necessary, the so obtained aqueous emulsion can be further dyed by adding with stirring a dye of the same class or different from that added hereinabove. It thus becomes possible to obtain various colors by operating in accordance with this procedure, i.e., by varying the dye added to the aqueous liquid and the dye added to the aqueous emulsion. Further, it is also possible to prepare the intended aqueous emulsion while carrying out the dyeing of said resin at the same time, say, by introducing concurrently but separately to an aqueous protective colloid solution with stirring an aqueous liquid of a soluble and fusible resin and a desired dye. Again, it is also possible to prepare the intended aqueous emulsion while carrying out the dyeing of said resin at the same time, for example, by introducing with stirring an aqueous liquid of a soluble and fusible resin to either an aqueous solution containing a protective colloid and a water-soluble dye or an aqueous solution containing a protective colloid and an oil-soluble (water-insoluble) dye. As still another procedure, the intended aqueous emulsion can be prepared, say, by introducing an aqueous liquid of a soluble and fusible resin to an aqueous protective colloid solution with stirring to prepare an aqueous emulsion of the undyed resin and then adding with stirring either a water-soluble or oil-soluble dye. In the case especially where an oil-soluble dye is used, good results are had by a procedure consisting of introducing an aqueous liquid of a soluble and fusible resin to an aqueous liquid containing a protective colloid and an oil-soluble dye with stirring. That good results are had by using an oil-soluble dye in an aqueous system is indeed amazing. In the case where a water-soluble dye is used, the employment of a procedure of adding the dye to an emulsion of an undyed soluble and fusible resin provides good results in that perfect dyeing is achieved with substantially all of the dye migrating to the resin. The fact that good results are had in that the water-soluble dye, as indicated above, migrates preferentially to said resin particles that are in a dispersed state in the emulsion is also amazing. This is very convenient, since the undyed aqueous emulsion of a soluble and fusible resin being extremely stable it can be kept in storage, and an aqueous emulsion of a dyed soluble and fusible resin can be prepared by stirring a dye into this aqueous emulsion at such subsequent times as required.

In preparing an aqueous emulsion of a dyed soluble and fusible resin, a satisfactory aqueous emulsion cannot be prepared by introducing the aqueous solution of a protective colloid into the aqueous liquid of a soluble and fusible resin during its preparation or immediately subsequent to its preparation while its temperature is relatively high. While the reason therefor is not completely clear, it is believed to be due to the fact that the protective colloid loses its activity as a result of its becoming dissolved into the resin. Hence, it is necessary to prepare the aqueous emulsion of said resin by introducing the aqueous liquid of a soluble and fusible resin to the aqueous protective colloid solution while the latter is in a state of agitation. An aqueous protective colloid solution in a state of agitation can be readily prepared by thoroughly agitating the solution using an agitator that can impart to the solution a strong shear strength, such, for example, as a colloid mill, disperse mill or homomixer.

As the protective colloid to be used, mention can be made of such as polyvinyl alcohol, carboxymethyl cellulose, sodium alginate, polyacrylic acid and water-soluble polyacrylates, of which conveniently used is polyvinyl alcohol in view of the stability of the emulsion obtained, its interaction with the curing catalyst, etc. Good results are obtained regardless of whether the polyvinyl alcohol is one which is completely or partially saponified or regardless of its degree of polymerization. The protective colloid is used in an amount of 0.5 – 30 parts by weight, and preferably 1 – 5 parts by weight, per 100 parts by weight of the soluble and fusible resin. There is a tendency to the particle size of the resulting fine particles becoming smaller as the amount used of the protective colloid is increased. The protective colloid is preferably used in the form of an aqueous solution.

The ultramicroscopic silica used effectively in this invention is one whose specific surface area, as measured by the BET Method involving the multilayer adsorption of nitrogen, falls within the range of about 50 $m^2/g$ to about 400 $m^2/g$. While the fineness of the ultramicroscopic silica usable in this invention can be inferred from the specific surface area as measured by the BET Method, an ultramicroscopic silica whose particle size is of the order of about 0.005 micron to about 0.05 micron as determined by an electron microscopic photograph can be used effectively in this invention. Those whose specific surface area is less than about 50 $m^2/g$ according to the BET Method, i.e., those whose particle size is too great, are not desirable, since their effect of preventing the formation of coarse particle groups of said finely divided hardened resin is small.

The ultramicroscopic silica is suitably used in a proportion of 1 – 15 parts by weight per 100 parts by weight of the soluble and fusible resin. When the amount used of the ultramicroscopic silica is less than this, its effect of preventing the formation of coarse particle groups of the finely divided hardened resin is slight. On the other hand, when the amount exceeds the foregoing range, this also is undesirable, since the viscosity of the aqueous emulsion of a soluble and fusible resin rises, with the consequence that it becomes difficult to maintain its stability without diluting it. Again, there is also a decline in the staining power of the finely divided hardened resin.

The ultramicroscopic silica is added to the aqueous emulsion of a soluble and fusible resin that has been dyed with a dye, either directly in its finely divided state or as an aqueous dispersion after first dispersing it in water. Both methods are equally effective.

At least a part of the total amount of the ultramicroscopic silica must be added to the aqueous emulsion of a dyed soluble and fusible resin before the hardening reaction. If necessary, it is also possible to add a part of the silica to the aqueous emulsion of the dyed soluble and fusible resin before the hardening reaction and then add the rest to the suspension of the dyed finely divided hardened resin after the hardening reaction. In this case, the amount of the ultramicroscopic silica to be added before the hardening reaction is preferably an amount corresponding to 80 – 90% by weight of the total amount to be used. Further, if the suspension is stirred after the addition of the ultramicroscopic silica, still greater effects can be achieved.

In the case of a finely divided hardened resin obtained by preparing a suspension of a finely divided hardened resin in an insoluble and infusible state by carrying out the hardening reaction without using ultramicroscopic silica, then admixing said silica, and thereafter separating and drying the resinous solid portion, there is noted hardly any improvement in dispersibility. Also in the case where the ultramicroscopic silica is added to either the aqueous liquid of a soluble and fusible resin or the aqueous solution containing a protective colloid prior to the emulsification, the dispersibility of the resulting finely divided hardened resin is poor.

The dyed soluble and fusible resin can be transformed to the intended insoluble and infusible hardened resin by a procedure consisting of adding the ultramicroscopic silica and curing catalyst to an aqueous emulsion of the dyed soluble and fusible resin followed by carrying out the hardening reaction by holding the temperature of the emulsion in the range of 40° – 60° C. for at least 1 hour, and preferably 2 – 10 hours, and thereafter raising the temperature up to one in the range of 60° – 200° C., and preferably 60° – 160° C. This finely divided hardened resin is obtained in the form of an aqueous suspension. When in this case the hardening of the resin is carried out without performing this pretreatment or by raising the temperature to above 60° C. in a short time of less than 1 hour, partial or total aggregation of the soluble and fusible resin is set up to result in the formation of large particles or lumps in addition to the finely divided particles. Again, no proportionate enhancement in effects can be expected even though the resin is held for periods longer than 10 hours, but there is instead the shortcoming that the resin is discolored. Further, while a higher temperature is desirable for carrying out the hardening adequately, a temperature in excess of 200° C. is objectionable, since the resin is degraded to result in a decline in the properties of the hardened resin. When the hardening is carried out at a temperature in the range of 100° - 200° C., the hardening is carried out under superatmospheric pressure. On the other hand, when the hardening is carried out at a relatively low temperature of the order ranging 60° - 80° C., for completing the hardening reaction a procedure consisting of drying the hardened resin after its separation from the suspension and thereafter heating the resin at a temperature in the range of 100° - 200° C. is also effective.

As the curing catalyst, usable are the mineral acids such as hydrochloric, sulfonic and phosphoric acids, the ammonium salts of these mineral acids, the sulfuric acids such as benzenesulfonic, toluenesulfonic and dodecylbenzenesulfonic acids, the organic acids such as phthalic and benzoic acids, and sulfamic acid. These curing catalysts are effectively used in an amount in the range of 0.01 - 8 parts by weight per 100 parts by weight of the soluble and fusible resin.

A finely divided hardened resin is obtained by separating from the suspension and drying the resin with or without heating at a temperature ranging from room temperature to about 200° C. and thereafter crushing the aggregates that have been formed by means of a secondary aggregative force, with a very slight force, say, a slight force of the order of that of lightly pressing the aggregates with the fingers, the finely divided hardened resin of the present invention can be obtained. As the method of heating to be used in this case, any of the heating methods including that of transferring the heat by means of conduction, radiation or convection, or a combination of these methods can be employed. However, preferred of these methods is the convectional heat transfer method in which hot air is forcedly circulated convectionally in view of the excellence of the drying speed and uniformity of drying. By submitting the finely divided hardened resin, after its drying, to a heat treatment at a temperature in the range of 100° - 200° C., the thermal resistance, water resistance and resistance to chemicals of the intended resin can be enhanced. Hence, the resin is preferably submitted to such a heat treatment, as required. However, when the drying is carried out at a relatively high temperature, the drying and the heat treatment are concurrently performed. Hence, in such a case an additional heat treatment is not required. Needless to say, the finely divided hardened resin of the present invention demonstrates excellent properties regardless of whether or not a heat treatment is given.

A specific process for producing the finely divided hardened resins of this invention is carried out in the following manner. As one mode, benzoguanamine is added to formalin, the pH is adjusted to come within the range of 5 - 10, and thereafter the reaction is carried out at a temperature ranging between 50° and 100° C. From the stage that the whole of the reaction system becomes a homogeneous solution, the reaction proceeds to result in the reaction system becoming turbid. When an aqueous resinous liquid whose degree of modified water tolerance ranges from 0 to 150% is formed, the reaction is terminated followed by mixing in a dye and a protective colloid to form an aqueous emulsion of a dyed soluble and fusible resin. To the so obtained emulsion are then added the ultramicroscopic silica and a curing catalyst, the former being added in an amount ranging from 1 to 15 parts by weight and the latter being added in an amount ranging from 0.01 to 5 parts by weight per 100 parts by weight of the resin, following which the hardening of the resin is carried out by holding the emulsion for at least 1 hour at a temperature of 40° - 60° C. followed by raising the temperature to that ranging from 60° to 200° C. at normal atmospheric or superatmospheric pressure. Thus is obtained a suspension of a finely divided hardened resin. A suitable acid is added to this suspension to form aggregates of the resin by aggregation of the dispersed resin. Then the aggregates of hardened resin are separated by filtration and thoroughly dried to remove the water. If necessary, the dried aggregates are then submitted to a heat treatment for 0.5 - 10 hours at a temperature in the range of 100° - 200° C. Now, by crushing the aggregates by application of a slight force, the intended finely divided hardened resin can be obtained.

The finely divided hardened resin obtained by the invention process which uses ultramicroscopic silica demonstrates extremely superior dispersibility when used as a pigment. Hence, the vividness and staining power of the dye used can be manifested effectively, with the consequence that in conjunction with the excellent properties of the benzoguanamine resins, such as superior heat resistance and resistance to solvents, the finely divided hardened resin of this invention can be used effectively in a very wide range of application.

The following examples will serve to more fully illustrate the invention. Unless otherwise specified, the parts and percentages used in the examples are on a weight basis.

EXAMPLE 1

A 4-necked flask equipped with a stirrer, a reflux condenser and a thermometer was charged with 150 parts of benzoguanamine, 130 parts of formalin (formaldehyde content 37%) and 0.52 part of a 10% aqueous solution of sodium carbonate. The pH of the mixture was adjusted to 8.0. While agitating this mixture, its temperature was raised to 95° C., and its reaction was carried out for 5 hours to obtain an aqueous liquid of a soluble and fusible resin having a degree of modified water tolerance of 60%.

Separately, an aqueous protective colloid solution was prepared by dissolving in 600 parts of water 6 parts of KURARAY POVAL 205 [a partially (87 - 89 mole%) saponified product of polyvinyl acetate (degree of polymerization 500) produced by Kuraray Co., Ltd., Japan]. After raising the temperature of this aqueous solution to 90° C., it was stirred at 7000 rpm with a high speed agitator (Homomixer, Model HV-M manufactured by Tokushu Kikako Co., Ltd., Japan). While this aqueous solution of protective colloid was being stirred, the foregoing aqueous liquid of a soluble and fusible resin having a degree of modified water tolerance of 60% was introduced to the aqueous protective colloid solution to obtain a white emulsion. After cooling this emulsion to 30° C., 1.5 parts of RHODAMINE B (Color Index = 45170) and 1.5 parts of RHODAMINE 6GCP (Color Index = 45160) were added thereto, following which the emulsion was stirred for 30 minutes at room temperature to obtain an aqueous emulsion of a dyed soluble and fusible resin.

A liquid obtained by homogeneously dispersing uniformaly in 67.5 parts of water 7.5 parts of ultramicroscopic silica of particle size about 0.012 micron and specific surface area of about 200 m$^2$/g as measured by the BET Method (AEROSIL-200, a product of Nippon Aerosil Co., Ltd., Japan) was added to the foregoing emulsion. Next, after adding 40 parts of 1N sulfuric acid, the emulsion was held for 2 hours at 40° C. with gentle stirring. The stirring of the emulsion was then continued successively at the several temperatures of 50°, 60°, 70°, 80° and 90° C. for 2 hours at each temperature to effect the hardening of the resin to obtain a suspension of a dyed finely divided hardened resin.

The finely divided hardened resin was separated from the suspension by filtration, and the filter cake was dried at a temperature of 100° C. followed by heating for 3 hours at a temperature of 150° C. to obtain 178 parts of aggregates of the finely divided hardened resin. These aggregates were de-aggregated by the application of a slight force of the order of that of lightly pressing between the fingers to obtain a dyed finely divided hardened resin of powder form.

The finely divided hardened resin obtained in this manner exhibited very excellent dispersibility. When this finely divided hardened resin was examined with a scanning electron microscope, it was found that the particles were present discretely and that they had not grapelike unions which had formed by secondary aggregation of the particles.

EXAMPLE 2

A 4-necked flask such as used in Example 1 was charged 150 parts of benzoguanamine, 130 parts of formalin (formaldehyde content 37%) and 0.52 part of 10% aqueous solution of sodium carbonate. While agitating this mixture, its temperature was raised to 94° - 95° C., and its reaction was carried out for 5 hours to obtain an aqueous liquid of a soluble and fusible resin. Then, 7.5 parts of KAYASET YELLOW G (a product of Nippon Kayaku Co., Ltd., Japan) were added to this aqueous liquid, following which the aqueous liquid was stirred for 30 minutes at 94° - 95° C. to obtain an aqueous liquid of a dyed soluble and fusible resin.

Separately, an aqueous protective colloid solution was prepared by dissolving in 600 parts of water 6 parts of KURARY POVAL 205. An aqueous protective colloid solution was stirred with Homomixer. While this aqueous solution was stirred, the foregoing aqueous liquid of a dyed soluble and fusible resin was introduced to the aqueous protective colloid solution to obtain a yellow emulsion.

A liquid obtained by homogeneously dispersing uniformly in 67.5 parts of water 7.5 parts of ultramicroscopic silica of particle size about 0.012 micron and specific surface area of about 200 m$^2$/g (AEROSIL-200) was added to the foregoing emulsion. Next, after adding 40 parts of 1N sulfuric acid, the stirring of the emulsion was continued successively at the several temperatures of 40°, 50°, 60°, 70°, 80° and 90° C. for 2 hours at each temperature to effect the hardening of the resin to obtain a suspension of a dyed finely divided hardened resin.

The finely divided hardened resin was separated from the suspension by filtration, and the filter cake was dried at a temperature of 100° C. followed by heating for 3 hours at a temperature of 150° C. to obtain aggregates of the finely divided hardened resin. These aggregates were de-aggregated by the application of a slight force of the order of that of lightly pressing between the fingers to obtain a dyed finely divided hardened resin of powder form.

The finely divided hardened resin obtained in this manner exhibited very excellent dispersibility. When this finely divided hardened resin was examined with a scanning electron microscope, it was found that the particles were present discretely and that they had not grapelike unions which had formed by secondary aggregation of the particles.

EXAMPLE 3

The same procedure as in Example 1 was followed to obtain a finely divided hardened resin, except that instead of the ultramicroscopic silica of a specific surface area of about 200 m$^2$/g as used therein ultramicroscopic silica of specific surface area of about 380 m$^2$/g and particle size of about 0.007 micron (AEROSIL-380, a product of Nippon Aerosol Co., Ltd., Japan) was used.

The so obtained finely divided hardened resin, as in the case with the product obtained in Example 1, exhibited very excellent dispersibility.

When this finely divided hardened resin was examined with an electron microscope, it was found that the particles were present discretely and that they had not grapelike unions which had formed by secondary aggregation of the particles.

EXAMPLE 4

A finely divided hardened resin was obtained by operating as in Example 1 but using instead of the ultramicroscopic silica of a specific surface area of about 200 m$^2$/g ultramicroscopic silica of particle size of about 0.04 micron and specific surface area of about 50 m$^2$/g (AEROSOL-OX50, a product of Nippon Aerosol Co., Ltd., Japan).

While the so obtained finely divided hardened resin was somewhat inferior in its dispersibility as compared with the product of Example 1, its dispersibility was satisfactory.

When this finely divided hardened resin was examined with an electron microscope, it was found that the particles were present discretely and that they had not grapelike union which had formed by secondary aggregation of the particles.

Control 1

The same procedure as that of Example 1 was carried out, except that the ultramicroscopic silica was not added to the aqueous emulsion before the hardening reaction. Thus was obtained a finely divided hardened resin.

However, the finely divided hardened resin obtained in this manner was inferior in its dispersibility as compared with the product of Example 1. Further, when this finely divided hardened resin was examined with an electron microscope, there was noted the sporadic presence in the resin of grapelike unions which had formed by secondary aggregation of the particles.

Control 2

The hardening reaction was completed by following the same procedure as that of Example 1 but without carrying out the operation of adding the ultramicroscopic silica to the aqueous emulsion before the hardening reaction.

Prior to filtering off the finely divided hardened resin, a liquid obtained by homogeneously dispersing 7.5 parts of ultramicroscopic silica of specific surface area of about 200 m²/g and particle size of about 0.012 micron (AEROSIL-200) in 67.5 parts of water was added to the suspension while stirring with a Homomixer. This was followed by carrying out the filtration, drying, heat treatment and application of a slight force of the order of that of lightly pressing between the fingers as in Example 1 to obtain the finely divided hardened resin of powder form.

The finely divided hardened resin obtained in this manner was, however, inferior in its dispersibility as compared with the product of Example 1. Further, when this finely divided hardened resin was examined with an electron microscope, there was noted the sporadic presence of particles which had united by secondary aggregation.

Control 3

An aqueous liquid of a soluble and fusible resin was obtained by operating as in Example 1. To this aqueous liquid was then added a liquid obtained by homogeneously dispersing 7.5 parts of ultramicroscopic silica of specific surface area of about 200 m²/g and particle size of about 0.012 micron in 67.5 parts of water, after which the mixture was stirred for 30 minutes at a temperature of 90° – 95° C.

Separately, 6 parts of KURARAY POVAL 205 was dissolved in 600 parts of water to prepare an aqueous protective colloid solution, which was vigorously stirred with a Homomixer. While agitating the aqueous protective solution, the foregoing aqueous liquid containing the ultramicroscopic silica was added thereto to prepare an aqueous emulsion of a soluble and fusible resin. After cooling this aqueous emulsion to 30° C., 1.5 parts of RHODAMINE B and 1.5 parts of RHODAMINE 6GCP were added, followed by stirring the emulsion for 30 minutes at room temperature to prepare an aqueous emulsion of a dyed soluble and fusible resin containing ultramicroscopic silica. After adding 40 parts of 1N sulfuric acid to this aqueous emulsion, it was heated with stirring at successively the temperatures of 40°, 50°, 60°, 70°, 80° and 90° C. for 2 hours at each temperature to obtain a suspension of a dyed finely divided hardened resin.

A finely divided hardened resin was then obtained from this suspension by following the same procedure as that described in Example 1.

The finely divided hardened resin thus obtained was, however, inferior in its dispersibility as compared with the product of Example 1. Further, when this finely divided hardened resin was examined with an electron microscope, there was noted the sporadic presence of unions of the particles resulting from the secondary aggregation of the particles.

EXAMPLE 5

The dispersibilities of the finely divided hardened resins obtained in Examples 1 – 4 and Controls 1 – 3 were tested in the following manner, using as the dispersing agent polyvinyl chloride and water. The results obtained are shown in the following table.

Polyvinyl chloride

The sample finely divided hardened resin was mixed in an amount of 1.0% with plasticized polyvinyl chloride in an amount of 1.0% and dispersed therein by rolling. The resulting sheet was examined by a loupe with a magnification of 15X.

Water

The sample finely divided hardened resin was dispersed in a 1.0% aqueous solution of a nonionic surfactant (PLURONIC L-44, a product of Asahi Electro-Chemical Co., Ltd., Japan). The resulting liquid was examined with a scanning electron microscope.

| Finely Divided Hardened Resin | | Dispersing Agent | |
|---|---|---|---|
| | | Polyvinyl chloride | Water |
| Example | 1 | No coarse particles | No coarse particles |
| " | 2 | " | " |
| " | 3 | " | " |
| " | 4 | " | " |
| Control | 1 | Presence of coarse particles | Presence of coarse particles |
| " | 2 | " | " |
| " | 3 | " | " |

EXAMPLE 6

To 100 parts of the emulsion of a soluble and fusible resin obtained as in Example 1 was added 0.04 part of a fluorescent brightening agent (KAYAPHOR C Conc., Color Index = Fluorescent Brightening Agent 168, a product of Nippon Kayaku Co., Ltd., Japan), after which the experiment was operated as in Example 1 to obtain a pure white finely divided hardened resin.

On examination of the so obtained product with a scanning electron microscope, it was found that the particles were present discretely.

EXAMPLE 7

A 4-necked flask such as used in Example 1 was charged with 120 parts of benzoguanamine, 30 parts of melamine, 162 parts of formalin (formaldehyde content 37%) and 0.65 part of a 10% aqueous solution of sodium carbonate. The pH of the mixture was adjusted to 8.0. While stirring this mixture, its temperature was raised to 95° C. and its reaction was carried out for 4.5 hours to obtain an aqueous liquid of a soluble and fusible resin having a degree of modified water tolerance of 95%.

Separately, 8.5 parts of KURARAY POVAL 117 (a completely saponified product of polyvinyl acetate, degree of polymerization 1700, a product of Kuraray Co., Ltd., Japan) was dissolved in 600 parts of water to prepare an aqueous protective colloid solution, which was raised to a temperature of 80° C. and stirred at 5000 rpm using a Homomixer. While continuing the agitation of this aqueous protective colloid solution, the foregoing aqueous liquid of a soluble and fusible resin of a degree of modified water tolerance of 95% was added thereto to obtain a white emulsion.

Nine hundred parts of the so obtained white emulsion was cooled to 40° C., after which 2 parts of RHODAMINE B (Color Index = 45172) and 2 parts of RHODAMINE 6 GCP (Color Index = 45160) were added to dye the emulsion and prepare an aqueous emulsion of a dyed soluble and fusible resin. To the so obtained aqueous emulsion was added a liquid obtained by homogeneously dispersing 2 parts of ultramicroscopic silica of particle size of about 0.012 micron and specific surface area as measured by the BET Method of about 200 m²/g in 23 parts of water. After the further addition of 3 parts of paratoluensulfonic acid to the emulsion, it was held at a temperature of 50° C. for 1.5 hours while gently stirring it with an anchor type agitator. The hardening reaction was then effected by holding the emulsion successively at the several temperatures of 60°, 70° and 90° C. for 2 hours at each temperature to obtain a suspension of a dyed finely divided hardened resin.

The finely divided hardened resin was then separated from the suspension by filtration, and the filter cake was dried for 2 hours with 80° C. hot air followed by heating the filter cake for 3 hours at a temperature of 140° C. to obtain 193 parts of aggregates of the finely divided hardened resin. When these aggregates were deaggregated by the application of a slight force of the order of that of lightly pressing between the fingers, a finely divided hardened resin of powder form having a pink fluorescent color was obtained.

When this finely divided hardened resin was examined with a scanning electron microscope, it was found that all the particles were present discretely.

EXAMPLE 8

A 4-necked flask of the same kind as that used in Example 1 was charged with 150 parts of benzoguanamine, 162 parts of formalin (formaldehyde content 37%) and 0.65 part of a 10% aqueous solution of sodium carbonate. The pH of the mixture was adjusted to 8.0. While stirring this mixture, its temperature was raised to 92° C. and its reaction was carried out for 4 hours to obtain an aqueous liquid of a soluble and fusible resin having a degree of modified water tolerance of 78%.

Separately, 10 parts of GOHSENOL NL05 [a completely (98.5 – 100 mol%) saponified product of polyvinyl acetate, degree of polymerization below 1000, a product of Nippon Synthetic Chemical Co., Ltd., Japan] was dissolved in 800 parts of water, followed by the addition of 5 parts of STYRENE YELLOW G (an oil-soluble dye produced by Badische Anilin- & Soda-Fabrik Aktiengesellschaft) and thereafter stirring and dispersing the dye with a Homomixer. To this dispersion was then introduced with stirring the foregoing aqueous liquid of a soluble and fusible resin having a degree of modified water tolerance of 78% to obtain a yellow emulsion by stirring at 8000 rpm with a Homomixer. After cooling this emulsion to 40° C., a liquid obtained by homogeneously dispersing 8 parts of ultramicroscopic silica of particle size of about 0.012 micron and of specific surface area of about 200 m²/g as measured by the BET Method (AEROSIL-200) in 68 parts of water was added to the emulsion. This was followed by the addition of 4 parts of dodecylbenzenesulfonic acid and heating the emulsion successively at the several temperatures of 40°, 50°, 60°, 70° and 90° C. for 2 hours at each temperature while gently agitating the emulsion with an anchor type agitator to obtain a suspension of a finely divided hardened resin.

The finely divided hardened resin was then separated by filtration, and the filter cake as dried for one hour with 90° C. hot air followed by heating for 4 hours at a temperature of 150° C. to obtain 203 parts of aggregates of a finely divided hardened resin. When these aggregates were de-aggregated by the application of a weak force of the order of that of lightly pressing with the fingers, a yellow, finely divided hardened resin of powder form was obtained.

When this yellow, finely divided hardened resin was examined with a scanning electron microscope, it was found that there were no coarse particles.

This yellow, finely divided hardened resin was added to polypropylene (a product of Sumitomo Chemical Co., Ltd., Japan) at the rate of 0.2 part of the former per 100 parts of the latter to impart coloring by the dry coloring technique, after which the colored polypropylene was injection molded with an injection machine under the conditions of cylinder temperatures of respectively 250° and 300° C. to obtain test specimens each having the dimensions of 43 × 77 × 3 mm. On comparison of the color of these specimens, no difference could be noted. That is to say, a change in the color due to the temperature of the cylinder could not be discerned.

The specimens and a white sheet of plasticized polyvinyl chloride were placed one on top of the other and left to stand for 3 days at a temperature of 30° C. with a 500-gram load placed atop the superposed sheets, after which the plasticized polyvinyl chloride sheet was examined. No transfer of color was noted. Further, the specimens were exposed for 400 hours to a fade-o-meter, but no fading was noted.

Again, by way of comparison, test specimens prepared in similar manner by injection molding, except that chrome yellow was used instead of the yellow, finely divided hardened resin, were compared with the test specimens obtained in accordance with the present invention. This comparison showed that the yellow, finely divided hardened resin was superior to chrome yellow pigment in staining power.

EXAMPLE 9

Example 8 was repeated, except that, instead of the STYRENE YELLOW G, AIZEN SPILON YELLOW GRH (a product of Hodogaya Chemical Co., Ltd., Japan, Color Index = Solvent Yellow 61) was used to obtain a yellow, finely divided hardened resin.

EXAMPLE 10

A paste obtained by mixing 4.5 parts of SUMIPLAST YELLOW HL₂R (an oil-soluble dye produced by Sumitomo Chemical Co., Ltd., Japan), one part of EMULGEN 930 (polyoxyethylene nonyl phenol ether, a nonionic surfactant produced by Kao Atlas Co., Ltd., Japan) and 50 parts of water was mixed with an emulsion of a soluble and fusible resin obtained as in Example 1, following which the mixture was stirred for 1 hour at 50° C. to effect the solution of the oil-soluble dye in the resin side by its migration thereto. The subsequent operations were carried out as in Example 1 to obtain a yellow, finely divided hardened resin.

Test specimens were prepared with this yellow, finely divided hardened resin following the procedure described in Example 8. When the bleeding test with the white, plasticized polyvinyl chloride sheet was carried out on these specimens, there was no bleeding at all.

EXAMPLE 11

A 4-necked flask such as used in Example 1 was charged with 150 parts of benzoguanamine, 162 parts of formalin (formaldehyde content 37%) and 0.65 part of a 10% aqueous solution of sodium carbonate. The pH of the mixture was adjusted to 8.0. While stirring this mixture, it was reacted for 5 hours at 93° C. to obtain an aqueous liquid of a soluble and fusible resin having a degree of modified water tolerance of 50%.

Separately, 5 parts of STYRENE YELLOW G and 4 parts of KURARAY POVAL 205 were added to 176 parts of water followed by mixing in a ball mill to obtain a dye suspension.

Further, there also was prepared separately an aqueous protective colloid solution by preparaing a solution in 700 parts of water of 2.5 parts of KURARAY POVAL 205, followed by raising the temperature of this aqueous solution to 80° C. and stirring same at 7000 rpm with a Homomixer.

The aforesaid aqueous liquid of a soluble and fusible resin having a degree of modified water tolerance of 50% and the dye suspension were then introduced concurrently but separately to the foregoing aqueous protective colloid solution with stirring to obtain a dyed emulsion. After cooling this emulsion to 40° C., a liquid obtained by homogeneously dispersing 21 parts of ultramicroscopic silica of specific surface area of about 200 m²/g as measured by the BET method and particle size of about 0.012 micron (AEROSIL-200) in 200 parts of water was added to the emulsion followed by the addition also of 6 parts of dodecylbenzenesulfonic acid. The emulsion was then successively heated at the several temperatures of 40°, 50° and 70° C. for 2 hours at each of the temperatures while gently stirring the emulsion. Thus was obtained a suspension of a finely divided hardened resin.

The finely divided hardened resin was separated by filtration, after which the filter cake was dried for 4 hours with 80° C. hot air and then heated for 4 hours at 150° C. to obtain 187 parts of aggregates of a yellow, finely divided hardened resin. These aggregates were readily crushed by a slight pressure to provide finely divided hardened resin of powder form.

When this finely divided hardened resin was examined with a scanning electron microscope, it was found that the particles were present discretely.

EXAMPLE 12

By operating as in Example 11 an aqueous liquid of a soluble and fusible resin having a degree of modified water tolerance of 50% was prepared.

Separately, an aqueous solution as prepared by dissolving 6.8 parts of KURARAY POVAL 205 in 610 parts of water, after which the temperature of this aqueous solution was raised to 80° C. followed by stirring it at 7000 rpm with a Homomixer to prepare an aqueous protective colloid solution. The foregoing soluble and fusible resin having a degree of modified water tolerance of 50% was then introduced to this aqueous protective colloid solution with stirring to obtain a white emulsion.

After cooling the emulsion to 30° C., 16.8 parts of AMINYL YELLOW E-GNL (an acid dye produced by Sumitomo Chemical Co., Ltd., Color Index = Acid Yellow 19) was added and dissolved therein, following which a liquid obtained by homogeneously dispersing 8.5 parts of ultramicroscopic silica of specific surface area of about 120 m²/g and particle size of about 0.016 micron (AEROSIL-R972, a product of Nippon Aerosil Co., Ltd., Japan) in 76 parts of water was added to the emulsion. This was followed by the addition of 20 parts of 1N hydrochloric acid and 9 parts of pratoluenesulfonic acid, after which the emulsion was heated successively at the several temperatures of 40°, 50°, 70° and 90° C. for 2 hours at each temperature while being gently stirred to effect the hardening of the resin, thus obtaining a suspension of a finely divided hardened resin.

The finely divided hardened resin was separated by filtration, after which the filter cake was dried for 3 hours with 80° C. hot air and thereafter heated for 3 hours at 150° C. to obtain 191 parts of aggregates of a yellow, finely divided hardened resin. These aggregates were readily crushed by a slight pressure to provide a yellow, finely divided hardened resin.

When this finely divided hardened resin was examined with a scanning electron microscope, it was found that the particles were present discretely.

EXAMPLE 13

A 4-necked flask such as used in Example 1 was charged with 150 parts of benzoguanamine, 130 parts of formalin (formaldehyde content 37%) and 0.52 part of a 10% aqueous solution of sodium carbonate, and a mixture having a pH of 8.0 was obtained. While stirring this mixture, its temperature was raised to 95° C., and its reaction was carried out for 4 hours to obtain an aqueous liquid of a soluble and fusible resin having a degree of modified water tolerance of 60%.

Separately, 4 parts of KURARAY POVAL 205 was dissolved in 690 parts of water, after which the temperature of this aqueous solution was raised to 90° C. This aqueous solution was then stirred at 7000 rpm with a Homomixer. This was followed by introducing the foregoing aqueous liquid of a soluble and fusible resin having a degree of modified water tolerance of 60% to the aqueous KURARAY POVAL 205 solution with stirring to obtain a white emulsion. This emulsion was cooled to 35° C. Next, a dispersion of 10 parts of SUMIKARON RED 3G (Color Index = Disperse Red 43, a product of Sumitomo Chemical Co., Ltd., Japan) in 120 parts of water was introduced into the white emulsion with stirring. This was followed by the addition to the emulsion of a liquid obtained by homogeneously dispersing 24 parts of ultramicroscopic silica of specific surface area of about 200 m²/g as measured by the BET Method and particle size of about 0.012 micron in 220 parts of water, after which the emulsion was thorogoughly stirred. Next, after adding 40 parts of 1N sulfuric acid, the temperature of the emulsion was raised to 40° C., following which the emulsion was held successively at the several temperatures of 50°, 70° and 90° C. for 2 hours at each temperature to obtain a suspension of a finely divided hardened resin. Ultramicroscopic silica of specific surface area of about 300 m²/g as measured by the BET Method and particle size of about 0.007 micron was then added to this suspension, and the suspension was stirred.

The finely divided hardened resin was separated from the so obtained suspension by filtration, and the filter cake was dried for 2 hours at 80° C. followed by heating for 4.5 hours at a temperature of 150° C. to obtain 191 parts of aggregates. It was possible to de-aggregate these aggregates with a weak force of the order of that of lightly pressing with the fingers to obtain a red, finely divided hardened resin of powder form.

When this finely divided hardened resin was examined with a scanning electron microscope, it was observed that the particles were pesent in a discrete state.

17

Control 4

To a 4-necked flask of the same kind as that used in Example 1 were charged 150 parts of benzoguanamine, 130 parts of formalin (formaldehyde content 37%) and 0.52 part of a 10% aqueous solution of sodium carbonate to prepare a mixture having a pH 8.0. While stirring this mixture, it was reacted for 3 hours at a temperature of 95° C. to obtain an aqueous liquid of a resin having a degree of modified water tolerance of 200%. When this resin was used and an emulsion was prepared by following the procedure described in Example 1, lumps were formed in a part of the emulsion even while it was being stirred, and while the emulsion was being cooled to 40° C., floculation was set up in a major portion of the emulsion.

Control 5

When to an emulsion of a soluble and fusible resin prepared by operating as in Example 1 was added dodecylbenzenesulfonic acid in like manner followed by heating the emulsion for 2 hours at a temperature of 70° C., the particles became large and in part of the emulsion were formed aggregates which adhered to the wall of the vessel.

We claim:

1. A process for producing a dyed finely divided hardened resin of uniform particle size excelling in dispersibility which comprises, in combination, the steps of reacting benzoguanamine with formaldehyde in a ratio of 1.0 mole of the former to 1.2 – 3.5 moles of the latter in an aqueous medium at a pH ranging between 5 and 10 to prepare an aqueous liquid of a soluble and fusible resin having a degree of modified water tolerance of 0 – 150%, preparing an aqueous emulsion of a dyed soluble and fusible resin by using said aqueous liquid, a dye and a protective colloid, adding to the thus prepared aqueous emulsion in a ratio of 1 – 15 parts by weight per 100 parts by weight of the soluble and fusible resin of ultramicroscopic silica of a specific surface area as measured by the Brunauer, Emmett and Teller Method in the range of about 50 $m^2/g$ to about 400 $m^2/g$ and a particle size in the range of about 0.005 to about 0.05 micron, adding a curing catalyst, holding the aqueous emulsion for at least one hour at a temperature in the range of 40° – 60° C., heating the aqueous emulsion at a temperature in the range of 60° – 200° C. at normal atmsopheric or superatmospheric pressure to harden the resin thereby preparing a suspension of a dyed finely divided hardened resin, and thereafter separating the hardened resin from the suspension followed by drying and de-aggregating the dried hardened resin.

2. The process of claim 1 wherein said aqueous emulsion of a dyed soluble and fusible resin is prepared by adding a dye to said aqueous liquid of a soluble and fusible resin having a degree of modified water tolerance of 0 – 150% followed by stirring the aqueous liquid to dye the resin and thereafter introducing said aqueous liquid to an aqueous protective colloid solution with stirring.

3. The process of claim 1 wherein said aqueous emulsion of a dyed soluble and fusible resin is prepared by introducing said aqueous liquid of a soluble and fusible resin having a degree of modified water toleance of 0 – 150% to an aqueous protective colloid solution with stirring to prepare an aqueous emulsion of said resin and thereafter adding a dye to said aqueous emulsion with stirring thereby to dye said resin and prepare said aqueous emulsion of a dyed soluble and fusible resin.

4. The process of claim 1 wherein said aqueous emulsion of a dyed soluble and fusible resin is prepared by a procedure consisting of adding a dye to said aqueous liquid of a soluble and fusible resin having a degree of modified water tolerance of 0 – 150% with stirring thereby dyeing said resin, introducing the dyed resin-containing aqueous liquid into an aqueous protective colloid solution to prepare an aqueous emulsion, and thereafter adding to said aqueous emulsion with stirring a dye different from that previously added to further dye the once dyed resin.

5. The process of claim 1 wherein said aqueous emulsion of a dyed soluble and fusible resin is prepared by adding with stirring to an aqueous protective colloid solution concurrently but separately said aqueous liquid of a soluble and fusible resin having a degree of modified water tolerance of 0 – 150% and a dye.

6. The process of claim 1 wherein said aqueous emulsion of a dyed soluble and fusible resin is prepared by adding said aqueous liquid of a soluble and fusible resin having a degree of modified water tolerance of 0 – 150% with stirring to an aqueous solution or aqueous liquid containing a protective colloid and a dye.

7. The process of claim 1 wherein said ultramicroscopic silica is one having a specific surface area as measured by the Brunauer, Emmett and Teller Method in the range of about 150 $m^2/g$ to about 300 $m^2/g$ and a particle size in the range of about 0.007 to about 0.02 micron.

8. The process of claim 1 which comprises substituting melamine for said benzoguanamine in an amount not exceeding 30 mol%.

9. A dyed finely divided hardened resin of uniform particle size and excellent dispersibility prepared by of the process claim 1.

10. The process of claim 1 wherein benzoguanamine is reacted with formaldehyde in a ratio of 1.0 mol of the former to 1.8 to 3.0 mols of the latter in an aqueous medium at a pH ranging between 5 and 10 at a reaction temperature in the range of from 50° – 100° C. to prepare an aqueous liquid of a soluble and fusible resin having a degree of modified water tolerance of 0 – 150%, preparing an aqueous emulsion of a dyed soluble and fusible resin by combining said aqueous liquid with a dye and from 0.5 to 30 parts by weight, per 100 parts by weight of the soluble and fusible resin of a protective colloid which is a completely or partially saponified polyvinyl alcohol, adding to the thus prepared aqueous emulsion in a ratio of 1 – 15 parts by weight per 100 parts by weight of the soluble and fusible resin of ultramicropscopic silica of a specific surface area as measured by the Brunauer, Emmett and Teller Method in the range of about 150 $m^2/g$ to about 300 $m^2/g$ and a particle size in the range of about 0.007 to about 0.02 micron, adding from 0.01 – 8 parts by weight per 100 parts by weight of the soluble and fusible resin of a curing catalyst selected from the group consisting of hydrochloric acid, sulfuric acid, phosphoric acid, the ammonium salt of hydrochloric acid, the ammonium salt of sulfuric acid, the ammonium salt of phosphoric acid, benzene sulfonic acid, toluene sulfonic acid, dodecyl benzene sulfonic acid, phthalic acid, benzoic acid and sulfamic acid, holding the aqueous emulsion at a temperature in the range of 40° – 60° C for from 2 to 10 hours, heating the aqueous emulsion at a temperature in the range of 60° – 200°C at normal atamospheric or superatmospheric pressure to harden the resin to thereby prepare a suspension of a dyed finely divided hardened resin, and thereafter separating the hardened resin from the suspension followed by drying and de-aggregating the dried hardened resin.

11. The process according to claim 10 wherein the finely divided hardened resin is heated at a temperature of from 100° – 200° C for from 0.5 to 10 hours.

* * * * *